(12) United States Patent
Shiga

(10) Patent No.: US 6,999,271 B2
(45) Date of Patent: Feb. 14, 2006

(54) PC CARD TYPE DRIVE APPARATUS

(75) Inventor: Hideaki Shiga, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 98 days.

(21) Appl. No.: 10/656,236

(22) Filed: Sep. 8, 2003

(65) Prior Publication Data

US 2004/0047070 A1    Mar. 11, 2004

(30) Foreign Application Priority Data

Sep. 9, 2002    (JP)    .............................. 2002-262630

(51) Int. Cl.
*G11B 17/02*    (2006.01)
(52) U.S. Cl. ................................ 360/97.01
(58) Field of Classification Search ............. 360/99.02, 360/99.03, 99.06, 99.07, 96.5, 96.6, 97.01; 369/77.1; 720/613, 630, 632–635, 641
See application file for complete search history.

(56) References Cited

U.S. PATENT DOCUMENTS 5,870,368 A * 2/1999 Nakamichi .................. 720/645
6,141,180 A * 10/2000 Smith ........................ 360/96.5

* cited by examiner

*Primary Examiner*—Robert S. Tupper
(74) *Attorney, Agent, or Firm*—Sughrue Mion, PLLC

(57) ABSTRACT

Generation of metallic dust due to metal-on-metal sliding contact between a case of a magnetic disk cartridge and a housing portion of a PC card type drive apparatus during insertion and ejection of the magnetic disk cartridge into and from the PC card type drive apparatus. A non-metallic coating having a low frictional coefficient and anti-wear properties is provided on surfaces of metal parts of the housing portion against which outer surfaces of the magnetic disk cartridge case slide during insertion and ejection thereof into and from the housing portion.

3 Claims, 2 Drawing Sheets

PC CARD TYPE DRIVE APPARATUS

BACKGROUND OF THE INVENTION

1. Field of the Invention

The present invention relates to a drive apparatus for a magnetic recording/reproducing apparatus in which a magnetic cartridge is loaded. More particularly, the present invention relates to a PC card type drive apparatus.

2. Description of the Related Art

In drive apparatuses in which flexible magnetic disks are loaded, a portion that houses a cartridge slides against outer surfaces of the cartridge case during loading thereof. However, problems, such as the dust generated by the sliding having effects on the recording characteristics, did not occur. This is because there is more than sufficient space in the drive apparatuses for housing conventional flexible magnetic disks, and they are provided with mechanisms for raising and lowering the cartridge during insertion and ejection thereof. Therefore, the amount of dust generated by sliding was small. In addition, the upper lids of the drive apparatuses as well as the cartridges often employed plastic as their materials. Therefore, metallic dust, which influences recording characteristics, was hardly generated during insertion and ejection of the cartridge.

However, in the case of miniature flexible magnetic disks, in which recording density has been dramatically improved, it has been found that dust, generated by sliding during loading, exerts influence on the recording characteristics thereof. Particularly in PC card type drive apparatuses, amounts of dust which had heretofore caused no problems are becoming problematic, accompanying the increase in recording capacity and density. It is known that metallic dust exerts significant influence on recording characteristics.

In PC card type drive apparatuses, both the drive apparatus and the cartridges used therein are thin. Therefore, the upper lids of the drive apparatuses and the cartridge cases employ metallic materials in order to secure rigidity. In addition, space in the drive apparatuses for housing the cartridges is limited, and no mechanisms for raising and lowering the cartridges during insertion and ejection thereof are provided. As a result, outer walls of the cartridge cases are inserted and ejected while sliding against inner walls of the drive apparatuses.

Accordingly, in PC card type drive apparatuses, metal-on-metal sliding contact among the outer walls of the cartridge case; an interior of the upper lid of the drive apparatus; a base portion of the drive apparatus main body; and movable metal parts of the drive apparatus main body cannot be avoided. Therefore, problems arose in that metallic dust was generated, exerting adverse influence on recording characteristics.

SUMMARY OF THE INVENTION

The present invention has been developed in view of the aforementioned problem, and it is the object of the present invention to provide a PC card type drive apparatus in which there is no metal-on-metal sliding contact, and which does not generate metallic dust.

The PC card type drive apparatus of the present invention comprises:

a housing portion for loading a magnetic disk cartridge therein; and a non-metallic coating having a low frictional coefficient and anti-wear properties, provided on surfaces of metal parts of the housing portion against which outer surfaces of the magnetic disk cartridge case slide during insertion and ejection thereof into and from the housing portion.

It is preferable that the non-metallic coating having a low frictional coefficient and anti-wear properties is selected from among PTFE's, PFA's, modified fluorine resins, Teflon® graphites, and diamond like carbons (DLC's).

The PC card type drive apparatus according to the present invention is provided with a coating having a low frictional coefficient and anti-wear properties, such as: PTFE; PFA; modified fluorine resin; Teflon® graphite; and DLC, covering the surfaces of the metallic parts of the magnetic disk cartridge housing portion. Therefore, there is no metal-on-metal sliding contact during insertion and ejection of the cartridge with the metallic surface of the cartridge case. Accordingly, no metallic dust is generated, and deterioration of recording characteristics does not occur.

DESCRIPTION OF THE PREFERRED EMBODIMENTS

Hereinafter, a preferred embodiment of the present invention will be described in detail with reference to the attached drawings.

FIG. 1A is a plan view, FIG. 1B is a right side view, and FIG. 1C is a bottom view of a miniature magnetic disk cartridge which is inserted and ejected into and from a PC card type drive apparatus by being pressed in and pulled out, called "Clik!™".

Figure 2:
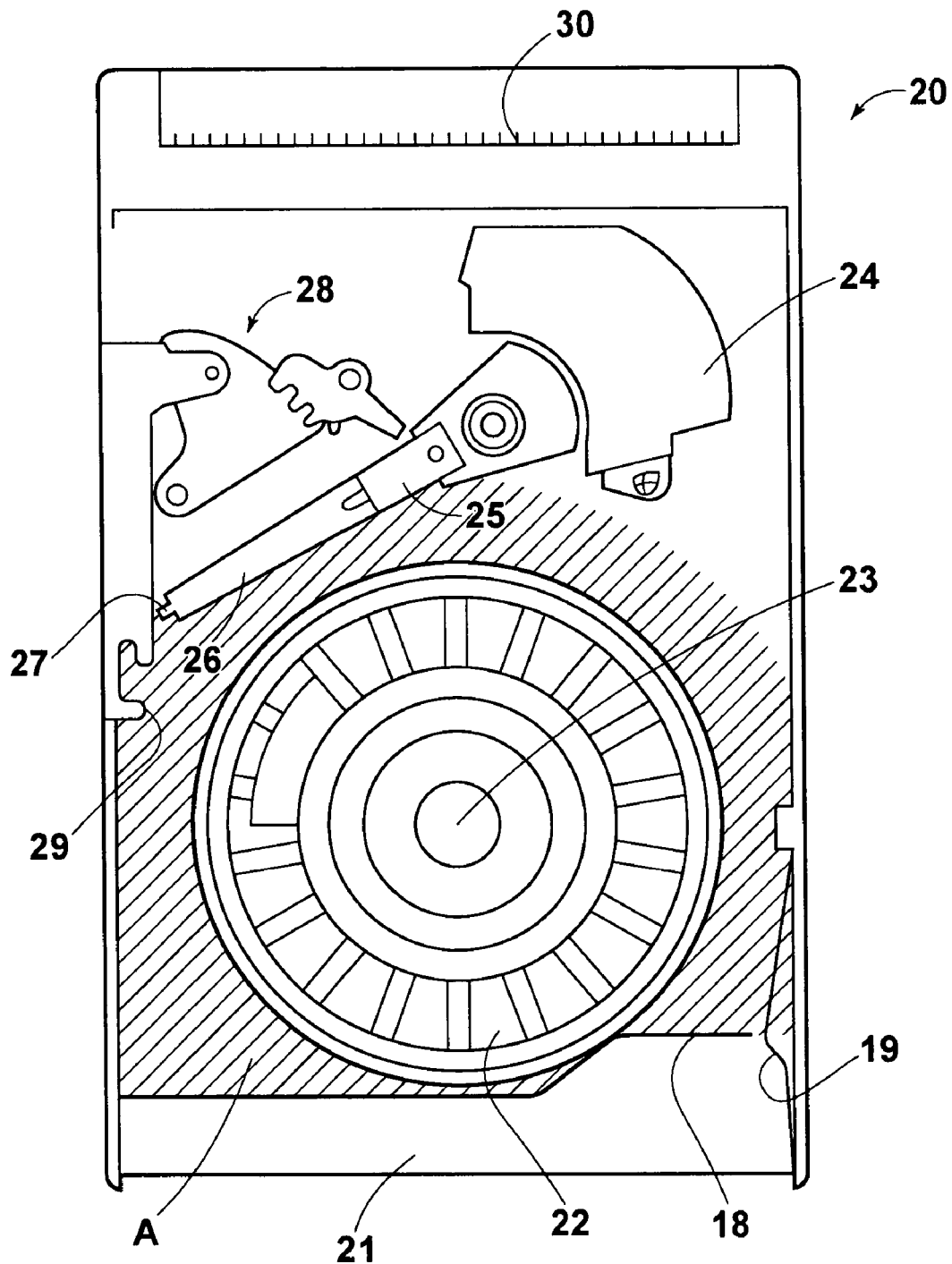
FIG. 2 is a plan view of a main body of the PC card-type drive apparatus according to the present invention.

FIG. 2 is a plan view of a main body of the PC card-type drive apparatus according to the present invention. The drive apparatus comprises: the drive apparatus main body 20 shown in the figure; and a metallic upper lid (not shown) for covering the main body 20 having substantially the same planar shape as the main body 20.

Figure 1:
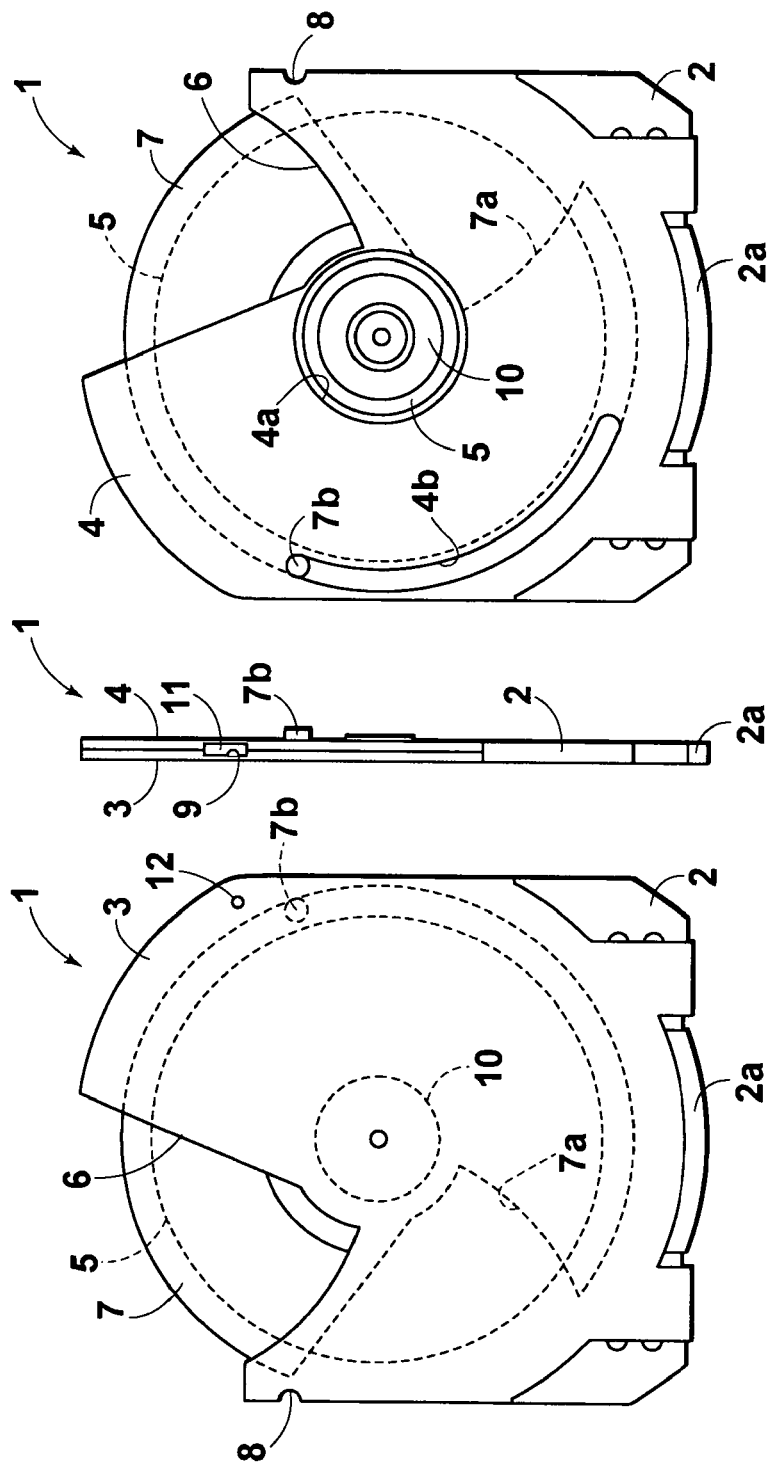
FIG. 1A is a plan view of a magnetic disk cartridge which is inserted and ejected into and from a PC card type drive apparatus according to the present invention.
FIG. 1B is a right side view of a magnetic disk cartridge which is inserted and ejected into and from a PC card type drive apparatus according to the present invention.
FIG. 1C is a bottom view of a magnetic disk cartridge which is inserted and ejected into and from a PC card type drive apparatus according to the present invention.

The magnetic disk cartridge 1 shown in FIG. 1 comprises: a flat case formed of a resin frame 2, which includes a pressing portion 2a, and upper and lower shells 3 and 4 which are formed by thin metallic plates; and a magnetic disk 5 rotatably housed within the case. The dimensions of the case are: width 50 mm, depth 55 mm, and thickness 1.95 mm. The diameter of the magnetic disk 5 is 1.8 inch (45.7 mm). The magnetic disk 5 has a recording capacity of 40 MB.

A V-shaped opening 6 and a rotary shutter 7 for opening and closing the opening 6 are provided in the case. The opening 6 is provided to enable a magnetic head 27 of the drive apparatus main body 20, shown in FIG. 2, to access the surface of the magnetic disk 5. The rotary shutter 7 is urged toward a closing direction (counterclockwise in FIG. 1A) by an elongate small diameter coil spring (not shown) provided within the case.

A notch 8 is formed in the front portion of the left side surface of the case. The notch 8 serves to engage with an engagement member 29 within the drive apparatus main body 20 to positively position the cartridge within the drive apparatus main body 20. A window 9 is formed in the front portion of the right side surface of the case. The window 9 enables a shutter locking member 11, for locking the rotary shutter 7 in the closed position, to face the exterior of the case. Note that FIG. 1 shows a state in which the rotary shutter 7 is locked in the closed position.

A circular opening 4a, which enables a rotational spindle 23 of the drive apparatus main body 20 to engage a center core 10 of the magnetic disk, is formed in the lower shell 4 of the case. An arcuate groove 4b, which is concentric with the rotary shutter 7, is also formed in the lower shell 4. A shutter knob 7b, which protrudes from and moves along the arcuate groove 4b to open and close the rotary shutter 7, is provided on the rotary shutter 7.

The shutter locking member 11, which locks the rotary shutter 7 in the closed position, is rotatably mounted on a shaft 12 which is provided in the case. The shutter locking member 11 is urged by a spring toward the direction in which the rotary shutter 7 is locked. A lock release member 19 is provided in the drive apparatus main body 20. During insertion of the magnetic disk cartridge 1 into the drive apparatus main body 20, the lock release member 19 presses the shutter locking member 11 through the window 9, to cause the locking member 11 to rotate slightly in the lock release direction, thereby releasing the lock of the rotary shutter 7.

The drive apparatus main body 20 shown in FIG. 2 is a Type II PC card type drive apparatus with its metallic upper lid removed. The dimensions of the drive apparatus are: width 53 mm, depth 85 mm, and thickness 5 mm. The drive apparatus main body 20 comprises: a slot 21, into which the disk cartridge 1 is inserted; a spindle motor 22; a spindle 23, for magnetically holding the center core 10 of the magnetic disk 5, attached to the spindle motor 22; a head actuator 24; a swing arm 25; and a head suspension 26 held by the swing arm 25. A magnetic head 27, for accessing the surface of the rotating magnetic disk 5 to perform recording and reproduction of data, is provided at the distal end of the head suspension 26.

The drive apparatus main body 20 further comprises: a push/push type cartridge engagement/ejection mechanism 28, equipped with the engagement member 29 for engaging the notch 8 of the magnetic disk cartridge 1; and an input/output interface 30 for communicating with electronic equipment that the drive apparatus main body 20 is mounted in, such as a digital camera, a personal computer, and the like.

An engagement wall 18, which extends perpendicular to the insertion direction of the magnetic disk cartridge 1 and serves as a shutter opening means, is formed toward the interior of the drive apparatus main body 20 on the right side thereof. The lock release member 19, for releasing the lock of the rotary shutter 7, which is locked in the closed position, when the magnetic disk cartridge 1 is inserted, is also provided toward the interior of the drive apparatus main body 20 on the right side thereof.

When the magnetic disk cartridge 1 is inserted into the slot 21 of the drive apparatus, first, the lock release member 19 presses the shutter locking member 11, and the shutter knob 7b engages the engagement wall 18 in this state. Therefore, the shutter knob 7b slides along the engagement wall 18 to rotate the rotary shutter 7 to the open position while compressing its urging coil spring, accompanying further insertion of the magnetic disk cartridge 1. Meanwhile, the engagement member 29 of the drive apparatus main body 20 engages the notch 8 of the magnetic disk cartridge 1, so that the magnetic disk cartridge 1 is housed at a predetermined position within the drive apparatus main body 20.

On the other hand, when the magnetic disk cartridge 1 is to be removed from the drive apparatus, the pressing portion 2a of the magnetic disk cartridge 1 is pressed. Thereby, the cartridge engagement/ejection mechanism 28 presses the magnetic disk cartridge 1 outward. At this time, the compressed rotary shutter urging coil spring secures an initial ejection speed. Meanwhile, the rotary shutter 7 is rotated to the closed position by the urging force of the aforementioned coil spring, and locked by the shutter locking member 11, accompanying ejection of the magnetic disk cartridge 1.

A region "A" about the periphery of the spindle motor 22, denoted by hatching in FIG. 2, is the surface region of a metallic base portion of the drive apparatus, against which the outer surface of the case of the magnetic disk cartridge 1 slide during insertion and ejection thereof with respect to the housing portion of the drive apparatus. In the present embodiment, the region A; the inner surface of the metallic upper lid, against which the outer surface of the magnetic disk cartridge 1 also slide; and surfaces of movable parts within the housing portion are covered with a coating having a low frictional coefficient and anti-wear properties, such as: PTFE; PFA; modified fluorine resin; Teflon® graphite; or DLC.

As is clear from the above description, the PC card type drive apparatus according to the present invention is provided with a coating having a low frictional coefficient and anti-wear properties, such as: PTFE; PFA; modified fluorine resin; Teflon® graphite; or DLC, covering the surfaces of the metallic parts of the housing portion for the magnetic disk cartridge 1. Therefore, there is no metal-on-metal sliding contact during insertion and ejection of the cartridge with the metallic surface of the cartridge case. Accordingly, no metallic dust is generated, and deterioration of recording characteristics due to dust does not occur.

What is claimed is:

1. A PC card drive apparatus comprising:
 a housing portion for loading a magnetic disk cartridge therein, the housing portion comprising a metallic base portion and a metallic upper lid; and
 a non-metallic coating having a low frictional coefficient and anti-wear properties, provided on surfaces of metal parts of the housing portion against which outer surfaces of the magnetic disk cartridge case slide during insertion and ejection thereof into and from the housing portion,
 wherein the surface of metal parts of the housing portion comprise a surface region of the metallic base portion and an inner surface of the metallic upper lid of the housing portion.

2. A PC card drive apparatus as defined in claim 1, wherein:
 the non-metallic coating having a low frictional coefficient and anti-wear properties is selected from among PTFE's, PFA's, modified fluorine resins, Teflon® graphites, and diamond like carbons (DLC's).

3. The PC card drive apparatus according to claim 1, wherein said magnetic disk cartridge comprises a rotary shutter.

* * * * *